Oct. 6, 1931.  A. R. THOMPSON  1,825,835
FRUIT PITTING APPARATUS
Filed May 6, 1929  6 Sheets-Sheet 5

Inventor
Albert R. Thompson
By Lyon & Lyon
Attorneys

Patented Oct. 6, 1931

1,825,835

UNITED STATES PATENT OFFICE

ALBERT R. THOMPSON, OF SAN JOSE, CALIFORNIA, ASSIGNOR TO PACIFIC MACHINERY COMPANY, OF SAN FRANCISCO, CALIFORNIA, A CORPORATION OF CALIFORNIA

FRUIT PITTING APPARATUS

Application filed May 6, 1929. Serial No. 360,863.

This invention relates to fruit pitting apparatus, and is more particularly related to an apparatus for halving and pitting fruit. This invention relates to an improvement in the construction and method of pitting fruit disclosed in my co-pending application for fruit pitting machine, Serial No. 223,898, filed October 4, 1927.

In the pitting of fruit, when employing a machine of the structure shown in or of a similar structure to that disclosed in my aforesaid co-pending application, difficulty has been encountered in properly clearing the fruit pitting machine of the pits of the fruit after the same have been freed from the flesh or halves of the fruit.

In the pitting of fruit, difficulty has also been encountered in the operation of fruit pitting machines due to the irregularity in size and shape of the pits and the fact that the pitting knives or means employed sometimes become snagged upon the pit of the fruit due to the irregularities of contour of the pit, resulting in breaking of the pitting knives or means.

An object of this invention is to provide a means for ejecting the pit from the fruit pitting machine after the same has been severed from the fruit.

Another object of this invention is to provide a means for ejecting the pit of the fruit from the fruit-pitting machine after the pit has been severed from the flesh of the fruit by actuating the fruit pitting means to engage the pit and dislodge the same from position in the fruit pitting machine and then returning the fruit pitting means to its normal starting position.

Another object of this invention is to provide means for ejecting the pit of the fruit from the fruit pitting machine after the same has been severed from the flesh of the fruit, which includes means for actuating pitting means to sever the pit from the flesh of the fruit, and means for actuating the fruit pitting means to engage and eject the pit from the machine; as when using a rotary pitting knife by rotating the rotary pitting knife once to sever the pit from the flesh of the fruit and then rotating the pitting knife through a second cycle to eject the pit from the pitting machine.

Another object of this invention is to provide a means for actuating the pitting means of a fruit pitting machine which includes means which are operated under a predetermined pressure and are yieldably held to release the pitting means when the pitting means engages a snag or portion of the pit imposing on the pitting means a pressure greater than the normal predetermined pressure.

Another object of this invention is to provide a fruit pitting machine which includes means for driving the fruit pitting means of the fruit pitting machine including a clutch including throw-out means, which are caused to operate when the fruit pitting means engages a snag on the pit of the fruit to enclose upon the pitting knife a pressure greater than the throw-out pressure adjusted in such clutch.

Other objects and advantages of this invention it is believed will be apparent from the following detailed description of a preferred embodiment thereof as illustrated in the accompanying drawings:

In the drawings:

Figure 9 is a fragmental sectional plan view taken substantially on the line 9—9 of Figure 2.

Figure 1:
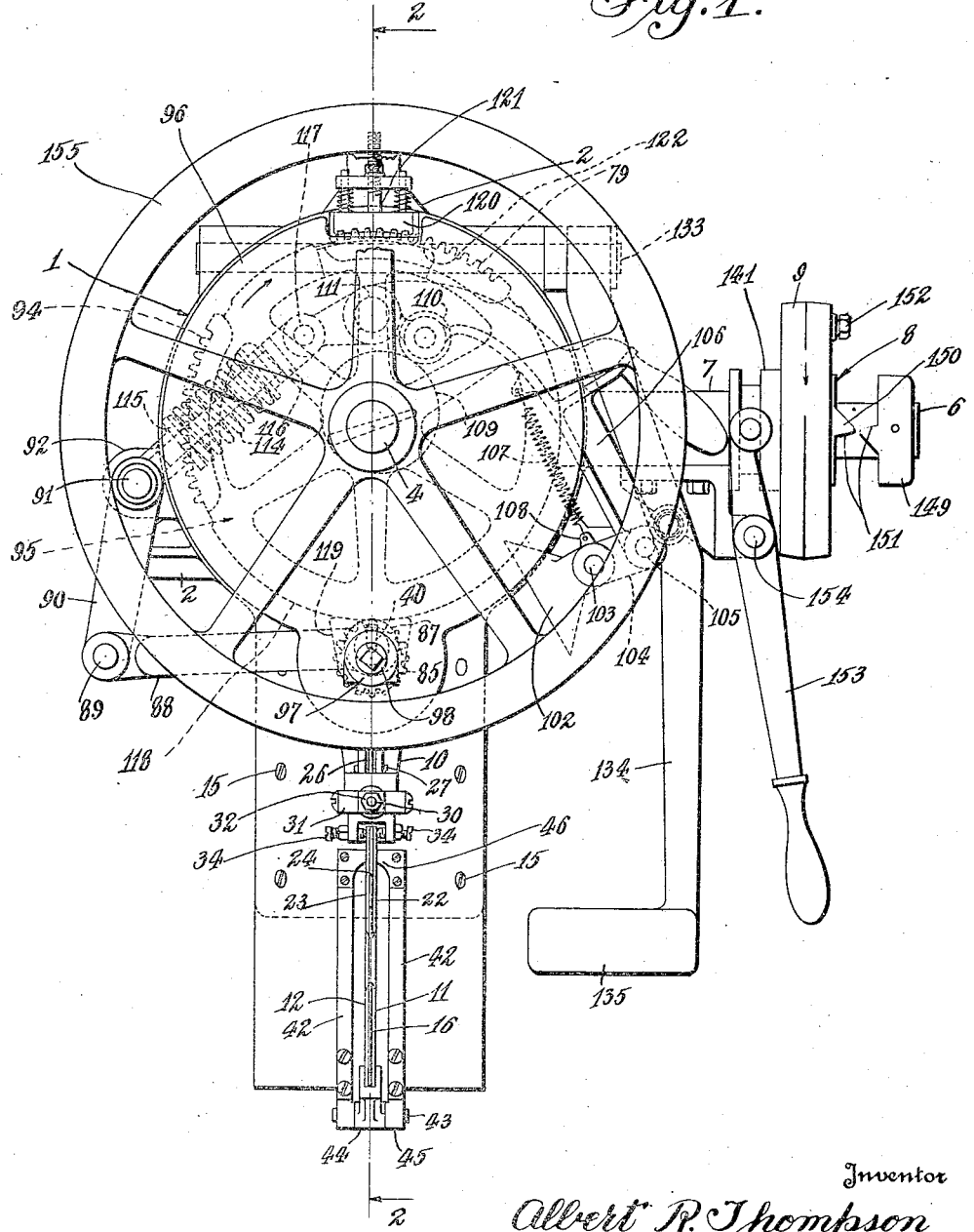
Figure 1 is a top plan view of a fruit pitting machine embodying this invention.

In the preferred embodiment of this invention illustrated in the accompanying drawings, 1 is a base casting provided with legs 2 for supporting the structure on a table or other support. Mounted in a bearing 3 provided by the base casting 1 is operating shaft 4. The operating shaft 4 is connected through a make-and-break clutch 5 with a countershaft 6. The countershaft 6 is supported in a bearing boss 7 formed as an extension of the base casting 1 and is connected through a pressure release clutch 8 with a pulley 9. The pulley 9 is operatively connected through any suitable or desirable means with a motor or other prime mover.

Supported by the base casting 1 and the cap casting 10 is an impaling blade upon which the fruit to be pitted is impaled and by which the fruit to be pitted is halved to the pit of the fruit, leaving the halves of the fruit adhering to the intact pit. The impaling blade includes a pair of complementary right and left-hand ringer blades 11 and 12 which are provided with inclined portions by means of which the ringer blades are secured to the inclined faces 13 and 14 of the base casting 1 by means of cap screws 15. The ringer blades 11 and 12 are held spaced apart by means of a ringer blade spacer plate 16 which is positioned between the vertically extending portions of the ringer blades 11 and 12 and held in position by means of screws 17.

The ringer blades 11 and 12 are stamped from sheet metal relatively thin and are, in practice, preferably spaced apart a slight distance, for example, three-thirty-seconds of an inch and are sharpened at their cutting edges as indicated at 18, 19 and 20 to knife edges so that a relatively thin slice will be cut from the periphery of the fruit to the pit thereof in the plane of suture of the pit determined from the exterior of a peach by the seam.

Secured to the end of the ringer blades 11 and 12 by means of a link 21 which fits between the ringer blades 11 and 12, is a pair of complementary movable ringer blades 22 and 23 formed as right and left-hand blades. The movable ringer blades 22 and 23 are held spaced apart by means of a movable ringer blade spacer plate 24 which is mounted between the blades 22 and 23 and held in position by means of countersunk screws 25. The movable ringer blades 22 and 23 are likewise connected with a link 26 which is pivotally secured as indicated at 27 to a vertical extension on the cap casting 10.

The links 21 and 26 are pivotally secured by means of pins 28 intermediate the blades 22 and 23.

Means are provided for yieldably urging the movable ringer blades 22 and 23 toward the stationary ringer blades 11 and 12, which means preferably includes a yoke 29 which is pivotally secured to the link 26 at one end and is provided with a shank 30 at its opposite end. The shank 30 extends through a bracket 31 at its upper end and is provided with an adjusting screw 32. Mounted on the shank 30 is a compression spring 33 which engages the upper edge of the yoke 29 at its lower end and the inner end of the bracket 31 at its upper end normally yieldably urging the link 26 downwardly on its pivot 27 and hence urges the blades 22 and 23 toward the blades 11 and 12.

Figure 3:
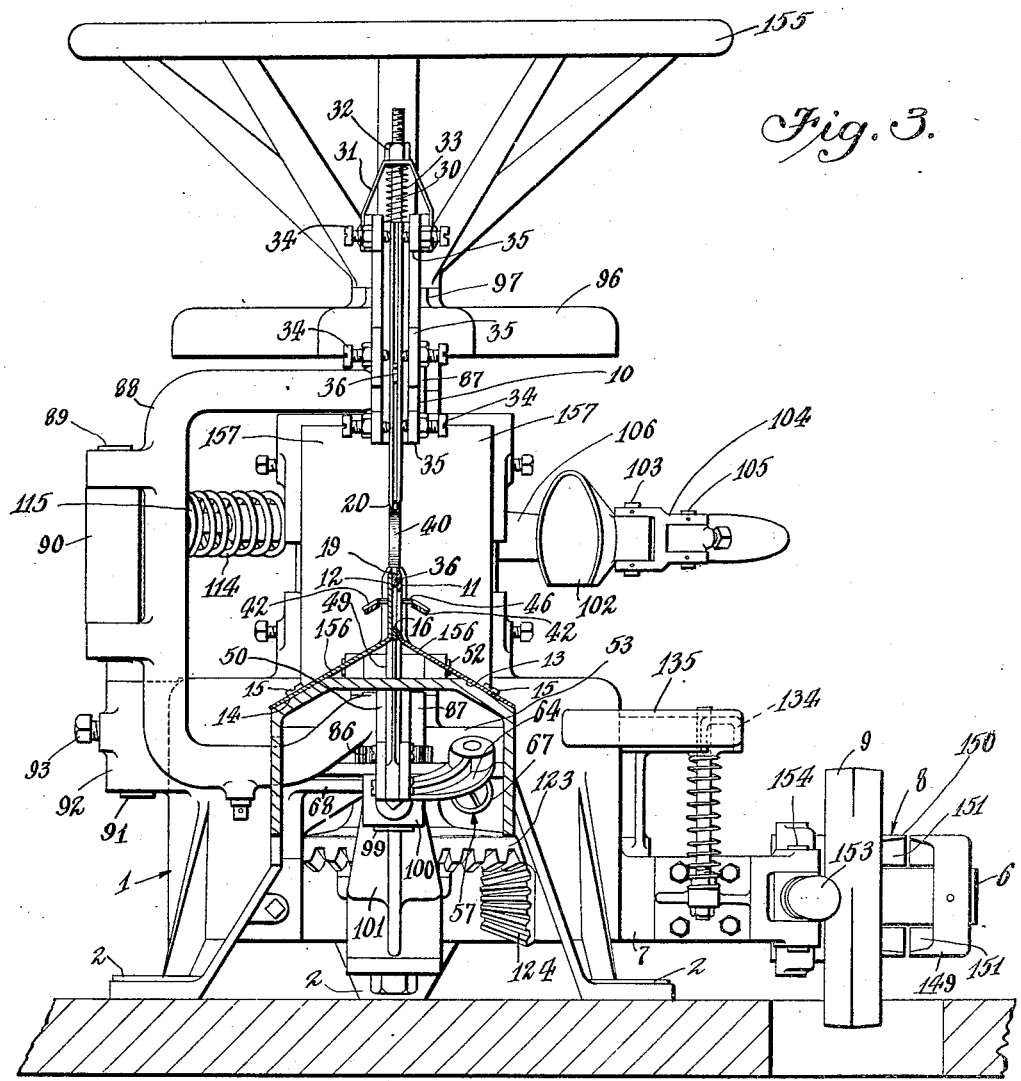
Figure 3 is a sectional front elevation taken substantially on the line 3—3 of Figure 2 of the fruit pitter embodying of this invention.

Means are provided for guiding the ringer blades 22 and 23 during this movement, which means preferably comprises a multiplicity of spaced cap screws 34 screw-threaded in ears 35 formed as extensions of the cap casting 10. The cap screws 34 are provided at their inner ends with rounded points as indicated in Figures 1 and 3, engaging the faces of the blades 22 and 23.

Means are interposed between the spaced ringer blades 11 and 12 and 22 and 23 for removing the slice of the fruit between the sharpened edges of said ringer blades, which means preferably includes knife members 36 which are interposed between the ringer blades and extend into position to cut the slice of the flesh of the fruit from the fruit between the cutting edges of said ringer blades.

Formed in the ringer blades 11 and 12 is a pit receiving recess 37 in which a pitting knife 40 is mounted.

The fruit to be pitted is impaled upon the impaling blade formed of the ringer blades 11 and 12 and 22 and 23 by first passing the fruit over the cutting edges 18, the ringer blades 11 and 12, and then downwardly so that the pit of the fruit passes through the path 38 formed between the cutting edges of the ringer blades 11 and 12 and 22 and 23.

The fruit to be pitted is positioned in relation to the ringer blades so that the plane of suture of the fruit determined by the external seam is in the plane determined by the ringer blades 11 and 12 and 22 and 23 and with the tipped end of the fruit downwardly. After the pit is pushed through the path 38 cutting the flesh of the fruit, the pit as determined by the width of the pit and the yielding movement of the ringer blades 22 and 23 and with the fruit held in the position thus described, the fruit is turned to pass the pit through the curve 39 and into the path 41 so that the flesh of the fruit is completely run in the plane of suture of the fruit to the pit. During this movement of the fruit, the cutting knives 36 remove the portion of the flesh of the fruit from between the ringer blades 11 and 12 and 22 and 23.

The use of the divided ringer blades and knives 36 insures that a clean cut will be formed between the halves of the fruit and the removing of the thin portion of the fruit between these ringer blades insures a flat, true surface so that the halves when divided from the pit will present a clean-cut, true appearance. As the fruit is moved through the path 41 its movement is finally arrested with the pit or stone of the fruit situated in the pit receiving recess 37 adjacent the pitting knife 40.

Means are provided for removing the tip end of the fruit as it is impaled on the impaling blade formed of the said ringer blades, which means are preferably of the following construction:

Secured to a yoke 42, which is mounted on opposite sides of the impaling blade and pivotally secured by means of a pin 43 passing through a cylindrical bearing boss 44 formed at the end of the bracket 45, is a tip-removing knife 46. The tip-removing knife 46 passes through a cut-out portion of the ringer blades 11 and 12 in position to place the cutting edge of said knife 46 directly in the path of the fruit as it is impaled on the impaling blade formed of said ringer blades so that as the fruit is passed on the impaling blade with the tip end downwardly, the knife 46 will sever the tip from the fruit.

In order to determine the depth of the cut of the knife 46 in removing the tip from the fruit, the yoke 42 is yieldably pivotally mounted on the pin 43 and is yieldably urged upwardly into the path of the fruit by means of a spring 47 which is secured at one end to the bracket 45 and at its opposite end to an arm 48 secured to the yoke 42. As the fruit is impaled on the impaling blade, the exterior periphery of the fruit engages the upper flat surfaces of the yoke 42 yieldably pushing said yoke away from the fruit but the tip of the fruit passes between the members of the yoke and is engaged by the cutting edge of the knife 46. The riding of the fruit on the yoke 42 thus determines that the knife 46 will merely remove the tip from the fruit irrespective of the size of the fruit being impaled on the impaling blade.

Means are provided for determining the position of the pit of the fruit in the impaling blade recess 37 in relation to the pitting knife 40 so that the pitting knife 40 will remove from the flesh of the fruit a core which very closely approximates the irregular contour of the fruit pit irrespective of the size of the pit and without leaving in the halves of the fruit thus severed from the pit the red center which surrounds the pit, particularly of peaches. In order to accomplish this result and to cut a clean core from the fruit so that the halves of the fruit will have a pleasing appearance, the following means are provided:

A push blade 49 is provided for engaging the pit of the fruit within the cut formed in the flesh of the fruit and for moving the pit into position in engagement with pitting knife 40 when the pitting knife 40 is in its normal position in the plane of the impaling blade and at the rear of the pitting recess 37. The push blade 49 likewise is retarded from engagement with the pit of the fruit after having positioned the pit of the fruit in relation to pitting knife 40 and provides a stop for holding the pit shifting out of the range of the curved pitting knife 40 and provides a shear plate between which and the pit of the fruit the pitting knife passes when passing through a position 180 degrees removed from its starting position in the recess 37.

Figure 8:
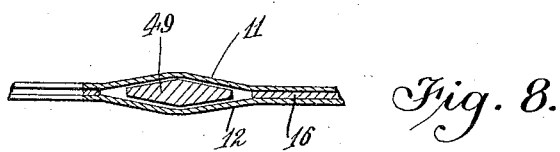
Figure 8 is a fragmental sectional view taken substantially on the line 8—8 of Figure 2.

The push blade 49 is mounted between the ringer blades 11 and 12 at a bulged portion of the ringer blades 11 and 12 as illustrated in Figure 8. The push blade 49 is secured to an arm 50 by means of countersunk screws 51. The arm 50 is provided with a cylindrical boss through which a pivot 52 passes to pivotally support the arm 50 and hence the push blade 49. The axis of the pin 52 is located substantially axially of the circle described by the inner curved arc of the push blade 49.

Means are provided for actuating the push blade 49 in timed relation with the movement of the curved pitting knife 40, which means are preferably of the following construction:

Secured to the shaft 4 is a cam 53. The cam 53 is formed to provide an enclosed cam race 54 within which a cam roller 55 is mounted. The cam roller 55 is carried by an arm 56 and the arm 56 is secured to a link 57. The end of the arm 56 is formed as a spherical ball 58 and is mounted within the socket 59. The socket 59 is formed with a ball seat 60 mounted within the socket 59 in position to engage the ball 58. The socket 59 is screw-threaded as indicated at 61 to an adjusting stud 62. A plug 63 is screw-threaded in the end of the socket 59 positioned to hold the ball 58 within the socket 59 on the ball seat 60. A form of adjustable universal joint connection is thus provided between the arm 56 and the link 57. Secured to the bracket end 64 of the arm 50 is a ball 65. The ball 65 is formed at the end of a stud screw-threaded into the bracket 64 and held in position by means of a lock nut 66. A socket 67 of the same construction as the socket 59 is provided and the ball 65 is held within the socket 67 and in a manner to provide an adjustable universal joint connection means between the bracket 64 and the link 57 in the same manner and including a similar construction to that described for holding the ball 58 within the socket 59.

In order to hold the cam roller 55 in position, a link 68 is provided which is pivotally connected with the bracket supporting the roller 55 below the cam 53 and is at its opposite end pivotally mounted on a pin 69 mounted in the base casting 1.

Figure 2:
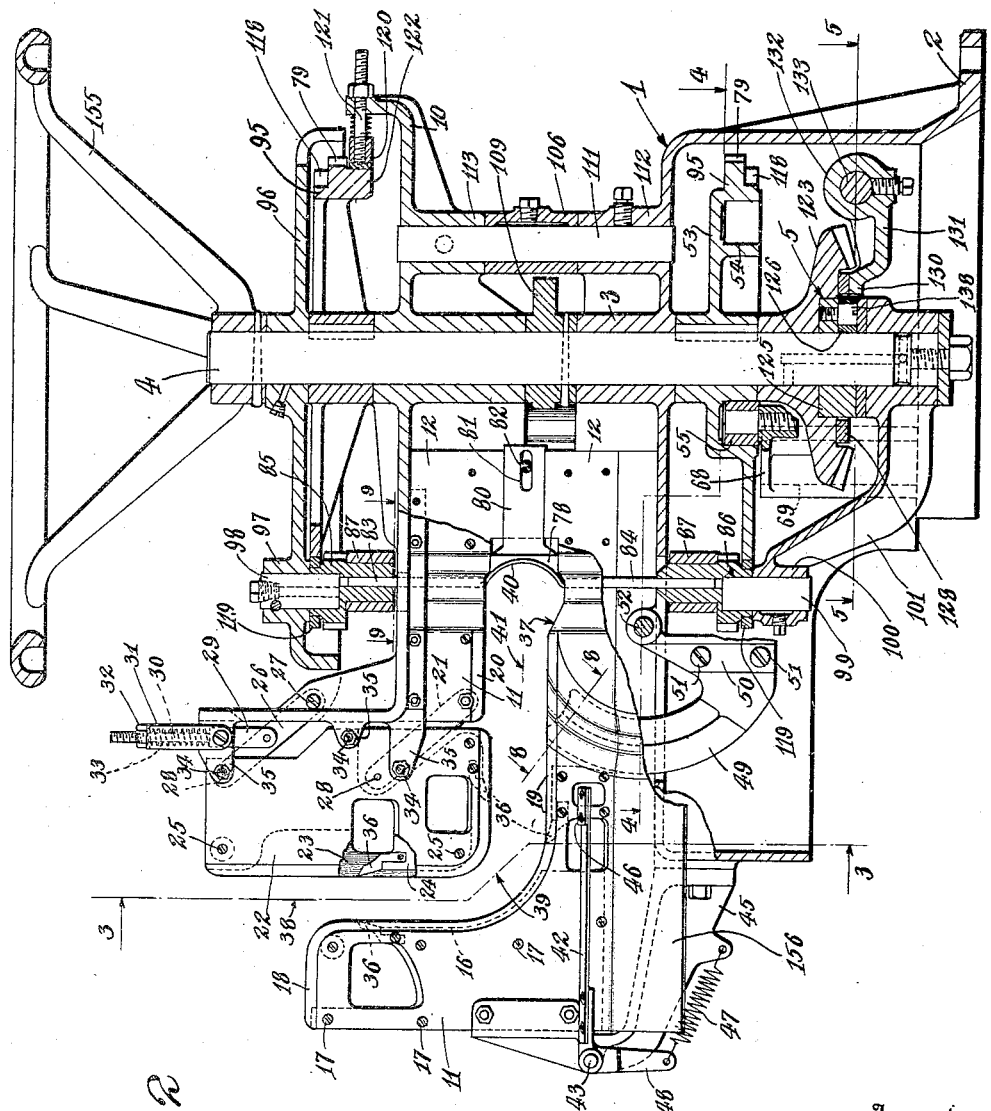
Figure 2 is a sectional side elevation taken substantially on the line 2—2 of Figure 1.
Figure 4:
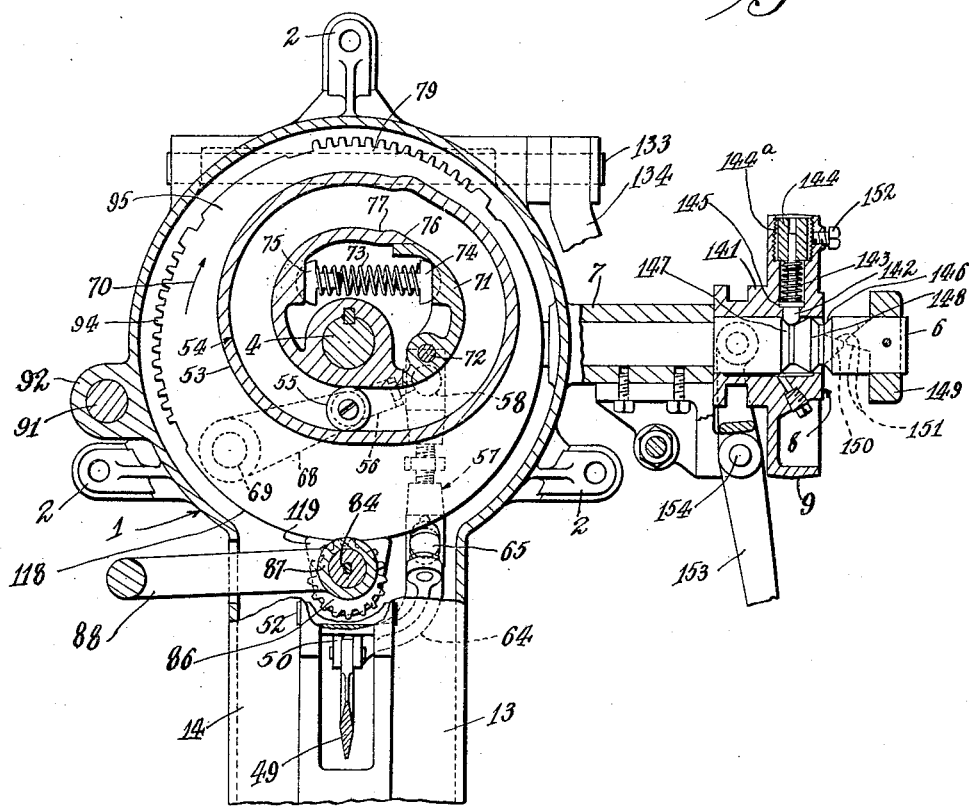
Figure 4 is a sectional plan view taken substantially on the line 4—4 of Figure 2.
Figure 5:
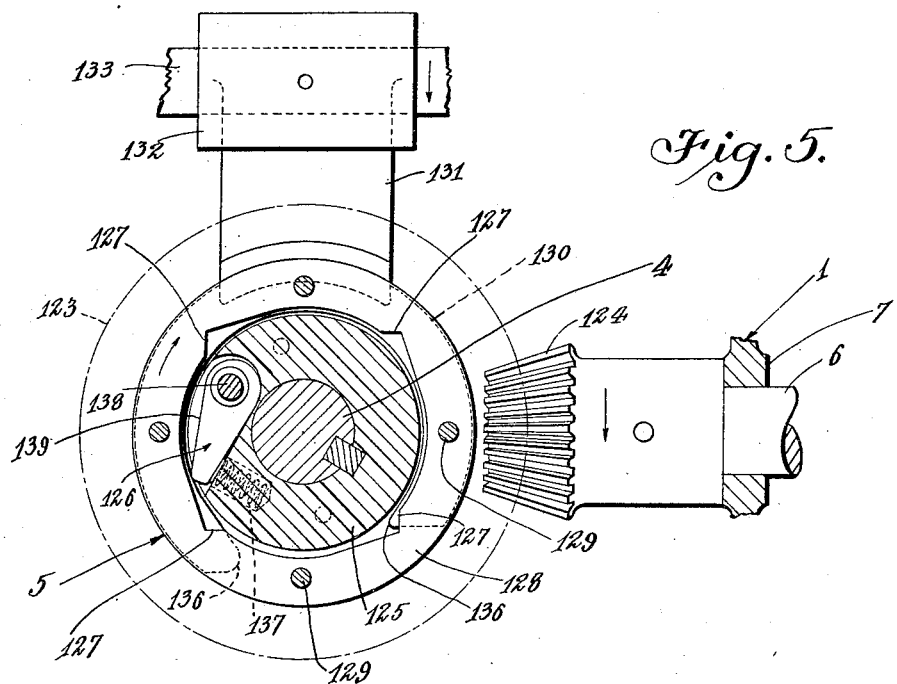
Figure 5 is a sectional plan view taken substantially on the line 5—5 of Figure 2.
Figure 6:
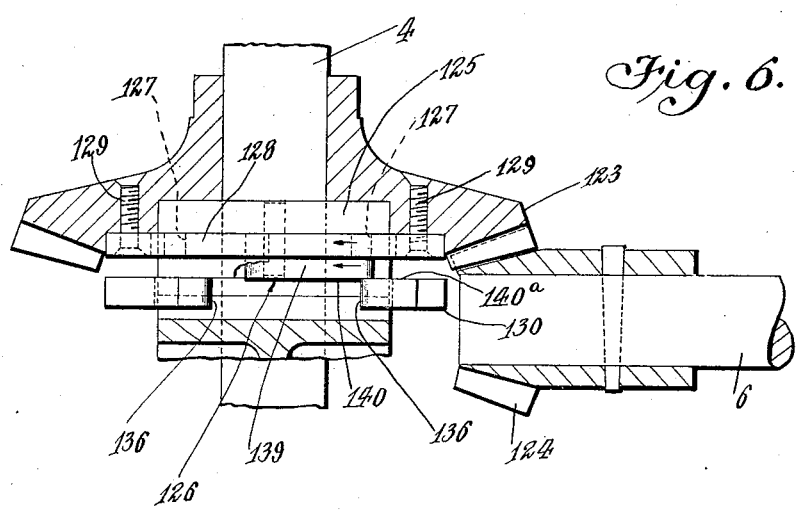
Figure 6 is a fragmental sectional elevation of a clutch mechanism included in this invention illustrating the clutch in position as it is about to be automatically released.
Figure 7:
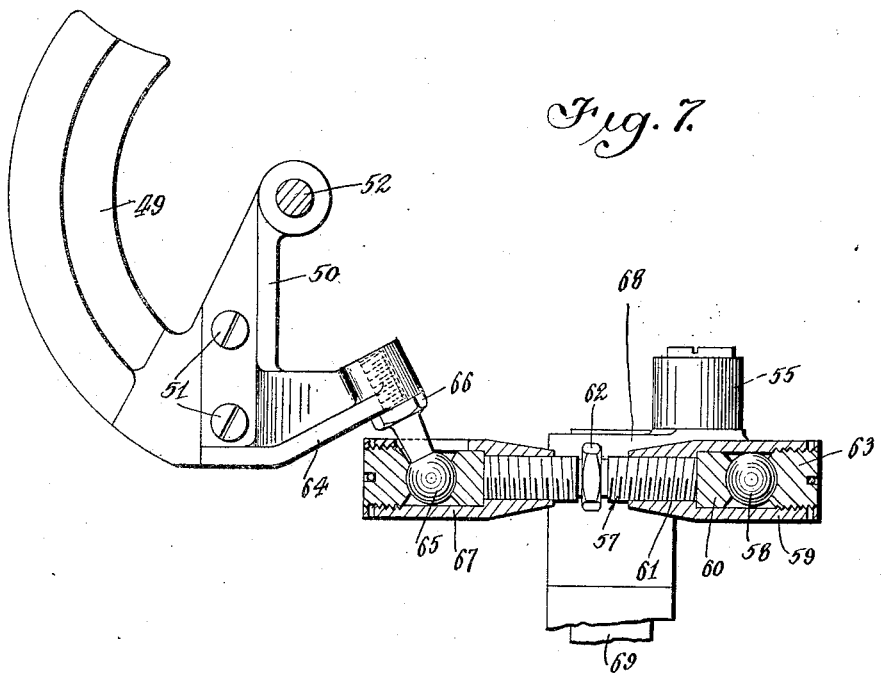
Figure 7 is a detail fragmental sectional view illustrating the means for connecting the push blade with its actuating mechanism.

When the cam roller is in the position illustrated in Figure 4, the push blade 49 is pulled backward into the position it occupies in Figure 2. The cam 53 is rotated in the direction of the arrow 70. As the cam 53 rotates, the surface of the cam causes roller 55 to move outwardly and thus advance the push blade 49 into the position to engage the pit of the fruit from within the cut formed in the flesh of the fruit and push the pit of the fruit up against the curved pitting knife 40. This movement of the push blade 49 occurs before there is any rotation of the pitting knife 40.

In order to yieldably force push blade 49 to yieldably urge the pit into its proper position in relation to the pitting knife 40, the cam 53 is formed with a yieldable gate 71 which is pivotally secured to the main body of the cam 53 by means of a pin 72. Mounted within the cam 53 is a spring 73. The spring 73 normally urges the gate 71 outwardly and for this purpose engages a contacting ball 74 mounted in a socket formed in the gate 71 at one end and a corresponding contacting ball 75 mounted in a socket formed in the body of the cam 53 at its opposite end.

The gate 71 yieldably urges the cam roller 55 outwardly to maintain the push blade 46 in contact with the pit of the fruit.

When the pit of the fruit has been positioned in relation to the pitting knife 40, and in order to permit the pitting knife 40 to freely operate, the roller 55 passes onto the flat portion 76 of the cam 53 as the pitting knife 40 starts to rotate. This passing of the roller 55 onto the flat portion 76 of the cam 53 relieves any pressure of the push blade 49 against the pit of the fruit and hence to the pitting knife 40, permitting the pitting knife 40 to freely operate.

As the pitting knife proceeds to rotate from its starting position, the pit is allowed to recede in the recess backwardly toward the opposite side of the recess following the movement of the pusher blade 49 until it is contacted with the pusher blade 49 at a position just within the cutting radius of the pitting knife 40. As the pitting knife 40 reaches a position 180 degrees from its starting position where it will again pass the edge of the pit in the plane of the impaling blade and will tend to pass at this point over the fins of the pit, the pusher blade is quickly retarded a slight distance to permit the knife 40 to pass around the pit without engaging the end of the pusher blade 49.

To permit the pusher blade 49 to retard at this point of the operation, the cam roller 55 passes into a depression 77 formed in the cam 53. As the pitting knife 40 passes the fin of the fruit in the plane of the impaling blade, it urges, when passing through its second 180 degrees, the pit of the fruit backwardly in the pitting recess 37 to a position adjacent the shear plate 78 mounted at the back of the pitting recess. The time of rotation of the pitting knife in relation to the cam 53 may be determined by the relative position of the cam 53 and gear segment 79, as shown in Figure 4. After the halves of the fruit have been severed from the pit by the pitting knife 40, the pusher blade 49 slowly retards to its starting position as indicated in Figure 4.

In order to provide for the use of different sized pitting knives 40 in the pitting recess 37 as may be required in order to handle different sized fruit having pits of different sizes, the back of the pitting recess is provided with a shear plate 78 which is adjustably mounted at the back of this recess by fitting into the cut-out recess formed in the impaling blade and having its shank 80 fitted between the ringer blades 11 and 12. The end of the shank 80 is provided with a slot 81 through which a bolt 82 passes. The bolt 82 also passes through bores formed in the ringer blades 11 and 12 and when screwed down will clamp the shear plate 78 in proper adjusted position in relation to the curved pitting knife 40.

The curved pitting knife 40 has a shallow curvature adapted to pass around the pit of the fruit from end to end. The curved pitting knife 40 forms a shallow cut in the flesh of the fruit and is curved to conform substantially to the curvature of the pit around the shortest of the maximum diameters or the thickness of the pit.

In order that the curved pitting knife 40 may be caused to pass around the pit of the fruit and follow the curvature thereof closely, irrespective of the width of the pit, the curved pitting knife is caused to move substantially in the plane of the cut formed in the flesh of the fruit by the impaling blade, that is, the axis of the curved pitting knife is moved during the rotation of the curved pitting knife in order that the curved pitting knife will follow closely the curvature of the pit but will pass around the laterally projecting fins which project outwardly from the pit. In order to shift the axis of the curved pitting knife 40 and to rotate the curved pitting knife 40 around the pit of the fruit, the following means are provided:

The curved pitting knife 40 has two oppositely extending shanks 83 and 84 which extend between the ringer blades 11 and 12 forming the impaling blade. The shanks 83 and 84 are releasably secured at their ends to eccentric pinions 85 and 86 which are journaled in bearing members 87 formed at the end of the pivotally mounted yoke 88.

The yoke 88 is preferably supported at a pivot 89 carried by an arm 90. The yoke 88 permits the axis of the curved pitting knife 40 to move as the eccentric pinions 85 and 86 are rotated substantially in the plane of the impaling blade which operates to prevent movement of the axis of the curved pitting knife 40 in a transverse direction. The arm 90 is secured in position holding said arm 90 from rotation by a pin 91 which is secured within a boss 92 formed from the base casting 1. The pin 91 is held from rotation by means of a cap screw 93, and the arm 90 is held from rotation on the pin 91 by means of a cap screw not shown.

Means are provided for holding the pinions 85 and 86 in position to mesh with the teeth of the gear segments 79 and 94 formed on the inner periphery of the gear wheel 95, which means preferably comprise a cover casting 96 which is journaled on the end of the shaft 4. Passing through boss 97 formed in the cover 96 is a bearing pin 98 which fits in axially into the gear portion of the eccentric pinion 85 and provides the axis around which the pinion 85 rotates when driven by the gear teeth of the segments 79 or 94. The shank 83 of the pitting knife 40 passes into a square hole formed in the eccentric pinion 85 in position eccentric to the member 98. The lower pinion 86 is connected with the shank 84 of the pitting knife 40 in the same manner, and a rotation pin 99 is passed through a boss 100 axially of the pinion 86 in the same manner as the member 98 and the pin 99 is secured from rotation in the boss 100 by means of a cap screw.

The boss 100 is in this instance formed as an integral part of a bracket 101 mounted on the lower end of the shaft 4.

Means are provided for holding the fruit on the impaling blade during the rotation of the pitting knife 40, which means preferably includes a holding cup 102 which is pivotally mounted on a pin 103 carried by a link 104. The link 104 at its opposite end is pivotally mounted by a pin 105 at the end of an actuating arm 106. In order to hold the cup 102 in position and permit the same to yieldably move in the plane of the impaling blade to follow the movement of the fruit on the impaling blade during the pitting operation, a spring 107 is provided which is connected at its inner end with the frame and at its other end with an eye 108 formed as an integral part of the cup 102. The spring normally holds the cup 102 in predetermined position which permits the cup to yield away from this predetermined position and rotate on the pins 103 and 105 to the position required to follow the movement of the fruit on the impaling blade during the pitting operation.

Means are provided for actuating the cup to and from holding position, which means are preferably of the following construction:

Secured to the shaft 4 is a cam 109. The cam is in position to engage a roller 110 carried by the actuating arm 106. The actuating arm 106 is pivotally secured in position on a pivot pin 111 mounted in bearing bosses 112 and 113 in the base and cap castings 1 and 10 respectively. As the shaft 4 rotates the cam 109 engaging the roller 110 permits the arm 106 to rotate on the pin 111 and bring the cup into position to hold the fruit on the impaling blade. The cam 109 operates to force the cup from holding position.

Means are provided for yieldably urging the cup 102 to holding position, which means preferably comprises a spring 114 which is mounted between the pivoted arm 115 and the pivoted arm 116. The arm 115 is pivotally mounted on the pin 91. The arm 116 is pivotally mounted on a pin 117 secured to an extension of the arm 106. The spring 114 acts in compression. The pin 117 is located off the center line drawn between the axis of the pivot 91 and the pivot 111 so that with the parts in the position indicated in Figure 1, the tendency of the spring 114 is to urge the cup 102 to holding position. If the operator of the machine, however, desires to throw the cup 102 out of operating position for any reason such, for example, as to replace the pitting knife 40 or to clean the machine, he merely grasps the cup 102 and pushes the same outwardly until the axis of the pin 117 is on the inside of the line drawn between the centers of the pins 91 and 111 and in this position the spring 114 will yieldably hold the cup 102 out of operative position.

Means are provided for ejecting the pit of the fruit from within the pitting recess 37 and for freeing the machine of the halves of the fruit severed from the pit, which means preferably include means for rotating the pitting knife 40 through a second complete revolution after the pitting knife 40 has been rotated once to sever the halves of the fruit from the pit and after the cup 102 has receded from holding position.

In order to rotate the pitting knife, gear wheels 95 are provided. The gear wheels 95 are provided with segments of gear teeth 79 which mesh with the teeth of the pinions 85 and 86. The gear wheels 95 are keyed to the shaft 4. Formed at a position spaced from the gear segment 79 are second gear segments 94 which likewise mesh with pinions 85 and 86 for rotating the pitting knife 40 through a second complete revolution. The gear segments 94 are spaced from the gear segments 79 on the inner periphery of the gear wheels 95 in order to provide a time lag between the first rotation of the pitting knife 40 during which the cup 102 recedes from its holding position, permitting the halves of the fruit to fall from the impaling blade if they will and in any event permitting the pit and the halves to fall out of the position they occupied when the pitting knife first passed around the pit of the fruit.

On the second rotation of the pitting knife the pitting knife engages the pit of the fruit, ejecting the pit from the pitting recess 37 and if the halves of the fruit are adhering to the faces of the impaling blade, the second rotation of the pitting knife causes these halves to fall away from the impaling blade breaking any adhesion that may have formed between the fresh cut faces of the fruit and the impaling blade due to the sticky character of the fruit juices.

Means are provided for holding the pitting knife 40 in its position in the plane of the impaling blade and at the back thereof as viewed in Figure 2 and for arresting the rotation of the pitting knife 40 after its second revolution has been completed, which means are preferably of the following construction:

A throw-out clutch 5 is provided for rotating the shaft 4 and releasing the shaft 4 from the shaft 6 after the shaft has been rotated one complete revolution. In order to stop the pitting knife 40 in position within the plane of the impaling blade, there are provided lock rims 118 which are secured to the gear wheels 95 by any suitable or desirable means. Lock washers 119 are mounted on and secured to the pinions 85 and 86 by any suitable or desirable means such, for example, as by welding the lock washers in position.

The lock rims 118 are cut out of the gear segments 79 and 94. The lock washers 119 have arcuate faces corresponding substantially to the curvature of the lock rims 118 and engage the periphery of the lock rims 118 where the rims are not cut out, thus holding the pinions 85 and 86 from rotating until the shoulders formed by the arcuate faces of the lock washers 119 pass into the cut-out portions of the lock rim. At this time the pinions 85 and 86 mesh with either the gear segments 79 or 94 to rotate the pitting knife through exactly 360 degrees in each case before the lock washers 119 again engage the periphery of the lock rims 118. This matter of holding the pitting knife from rotation except through 360 degrees when actuated by gear segments is as illustrated in my copending application Serial No. 223,898 except that as is herein illustrated two such gear segments are provided and cut-out portions of the lock rims are provided for permitting each gear segment 79 or 94 to rotate the pitting knife through 360 degrees.

In order to prevent the shaft 4 from drifting due to the slight friction between the bevelled gear 123 and shaft 4, I provide a brake consisting of brake shoe 120 mounted at the end of a stud 121 in position to engage the gear wheel brake shoe 122 as the pinions 85 and 86 pass out of engagement with the gear segments 79 and to hold the pinions from free rotation during the interval of time that the gear wheel is rotating from the position at the end of the gear segment 79 to the start of the teeth of the gear segment 94.

The brake thus functions to hold the pitting knife in position substantially as shown in Figure 2 until the pinions 85 and 86 are engaged by the second gear segment 94 for rotating the pitting knife through its second revolution.

The make-and-break clutch 5, provided for rotating the shaft 4 through a single revolution, may be of any suitable or desirable construction and is herein illustrated as being formed of a beveled gear 123 which is journaled freely on the shaft 4. The beveled gear 123 meshes with a beveled pinion 124 secured to the shaft 6. Keyed to the shaft 4 is a clutch driving ring 125. The clutch driving ring 125 carries a clutch dog 126 which is adapted to be engaged by any one of a plurality of shoulders 127 formed from the inner periphery of the clutch ring 128 which is secured to the under face of beveled gear 123 by means of countersunk screws 129. A shifting fork 130 is provided which is connected through its shank 131 to a collar 132 secured to a shaft 133. The shaft 133 is journaled in bearing bosses formed in the base casting 1 and projects outwardly therefrom and is secured to an operating lever 134 having an operating handle 135. The dog 126 is yieldably urged outwardly by means of a compression spring 137 mounted within a cored hole formed in the clutch drive ring 125 in position to engage the back face of the dog 126 and urge the dog to pivot upon its pivotal support 138 carried in the clutch drive ring 125.

The method of operation of this make-and-break clutch 5 is:

The gear 123 is at all times rotating as driven by the pinion 124. When the operating handle 135 is depressed, the fork 130 moved downwardly into a position to release the dog 126 and permit the same to move outwardly. The shoulder 127 and the ring 128 then engages the dog 126, establishing a driving connection between the gear 123 and the drive ring 125, the shaft 4 being thus driven from the gear 123. When the shaft 4 is rotated to where the dog is in position to drop into the recess formed between the ends 136 of the fork 130, the clutch, on further rotation, is released by the dog being cammed inwardly to its non-engaging position by the outer periphery 139 of the dog 126 riding upon the inner periphery of the fork 130. When the fork is dropped downwardly by actuation of the handle 135 to permit the dog 126 to be pushed outwardly by the spring 137, and then the fork 130 allowed to rise again, the under edge 140 of the dog 126 rides on the upper face 140$^a$ of the yoke until the recess is reached between the ends 136 of the fork 130.

Means are provided for breaking the driving connection from the prime mover to the pitting knife 40 when the pitting knife 40 hangs up on a snag of a fruit pit or its rotation is resisted by other means causing a predetermined pressure to be set up back through the connecting means and which releasing means are preferably of the following construction:

Referring to Figure 4, the pressure release clutch is illustrated as disengaged and including a clutch collar 141 formed integral with the pulley 9. Mounted within the pulley 9 is a plunger 142 which is yieldably urged downwardly by means of a spring 143. A plug 144, having a bore therein adapted to slidably receive the shaft of the plunger 142 is screw-threaded into a threaded hole 144ª formed from the periphery of the pulley 9. The spring 143 is interposed between the plug 144 and a shoulder 145 formed on the plunger 142. The plunger 142 has a rounded nose adapted to normally ride in a groove 146 formed in the shaft 6. A second groove 147 is formed in the shaft 6 in which the nose of the plunger 142 rides when the clutch has been disengaged. The ridge 148 of the shaft 6 dividing the grooves 146 and 147 provides a means for holding the plunger 142 in either the groove 146 or 147.

Secured to the shaft 6 is a driving dog 149 which is adapted to engage a driving lug 150 formed outwardly from the hub of the pulley 9 when the plunger 142 is in the groove 146 and adapted to be disengaged from the dog 149 when the plunger 142 is in the groove 147. When a predetermined resistance is set up to the shaft 6, the plunger 142 yields against the spring 143 and permits the pulley 9 to shift along the shaft 6 until the plunger 142 moves from the groove 146 to the groove 147 when the pressure is relieved.

In order to accomplish this result, the driving dogs are formed with inclined faces 151 which aids the pulley 9 to shift along the shaft 6 when such a predetermined pressure is set up in the shaft 6. The pressure at which the plunger 142 will release the driving connection is adjusted by adjusting the pressure of the spring 143 by threading in or out the plug 144. The plug 144 is locked into adjusted position by means of a cap screw 152.

In order to reestablish the driving connection from the pulley 9 to the shaft 6, a shifting fork 153 is provided which is pivotally supported as indicated at 154 and engages within the clutch collar 141 permitting by actuation of the arm 153 the pulley 9 to be moved along the shaft 6 to permit the dogs 149 and 150 to be engaged.

By holding the handle 153 the operator may force the pitting knife 40 to pass over the pit obstruction if he so desires. Under ordinary conditions, however, the hanging up of the pitting knife 40 on a snag of a fruit pit will result in breaking of the pitting knife. It is to relieve this condition that the pressure clutch just described is provided.

In order to permit the operator to rotate the pitting knife 40 to a position where he may clear the knife from the projection of the fruit pit upon which it has caught, and also in order to permit manual operation of this pitting machine when desired for any of a number of purposes, a hand wheel 155 is provided secured to the top of the shaft 4.

The ringer blades 11 and 12, as heretofore set forth, are stamped out of sheet metal and are provided with the downwardly inclined skirts 156 by means of which the ringer blades 11 and 12 are secured in position. The inclined skirts 156 form guards for preventing juice, or portions of the flesh of the fruit or pit from dropping into the operating mechanism of the pitting machine. The ringer blades 11 and 12 are further formed at their rear ends with right-angle extension guards 157 which likewise provide guards fitting the face of the base and cover castings as will be apparent from Figure 3, preventing the fruit juices, pulp or portions of the pit of the fruit passing into the operating mechanism of the machine behind the impaling blade.

Having fully described my invention, it is to be understood that I do not wish to be limited to the details herein set forth, but my invention is of the full scope of the appended claims.

I claim:

1. In a machine for pitting fruit, the combination of means for halving the flesh of the fruit, means adapted to pass around the pit of the fruit to free said halves from the pit, and means to actuate said pit-freeing means to eject the pit from the machine.

2. In a machine for pitting fruit, the combination of means for halving the flesh of the fruit, means adapted to pass around the pit of the fruit to free the said halves from the pit, and means to actuate said pit-freeing means to eject the pit from the machine and return the pit-freeing means to the starting position.

3. In a machine for pitting fruit, the combination of means for severing the pit from the flesh of the fruit, and means to actuate said pit-freeing means to free the pitting machine of said pit.

4. In a fruit pitting machine, the combination of an impaling blade, a rotary pitting knife mounted in the plane of the impaling blade, means for rotating the pitting knife to sever the halves of the fruit from the pit and permit the said halves to fall from the pit, and means for rotating the pitting knife to free the impaling blade of the pit.

5. In a fruit pitting machine, the combination of an impaling blade, a rotary pitting knife mounted in the plane of the impaling blade, means for rotating the pitting knife to sever the halves of the fruit from the pit and permit the said halves to fall from the pit, means for rotating the pitting knife to free the impaling blade of the pit, and to return the pitting knife to its position in the plane of the impaling blade.

6. In a fruit pitting machine, the combination of an impaling blade, pitting means normally mounted in the plane of the impaling blade, means for actuating the pitting means to sever the halves of the fruit from the pit and permit the said fruit halves to fall from the pit, and means for actuating the pitting means to free the impaling blade of the pit.

7. In a fruit pitting machine, the combination of an impaling blade, pitting means normally mounted in the plane of the impaling blade, means for actuating the pitting means to sever the halves of the fruit from the pit and permit the said fruit halves to fall from the pit, and means for actuating the pitting means to free the impaling blade of the pit and return the pitting means to its position in the plane of the impaling blade.

8. In a fruit pitting machine, the combination of an impaling blade upon which fruit is adapted to be impaled, means for severing the pit from the impaled fruit, and means for actuating the pit severing means to free the impaling blade of the pit.

9. In a fruit pitting machine, the combination of an impaling blade having a pit receiving recess into which the pit moves on the impaling of the fruit, a rotary pitting knife normally mounted in the plane of the impaling blade, means for rotating the pitting knife around the pit to sever the flesh of the fruit from the pit, and means for rotating the pitting knife around the pit a second time to free the impaling blade of the pit.

10. In a fruit pitting machine, the combination of an impaling blade, pitting means normally mounted in the plane of the impaling blade, means for rotating the pitting means to sever the halves of the fruit from the pit, and means for rotating the pitting means to free the impaling blade of the pit.

11. In a fruit pitting machine, the combination of an impaling blade, pitting means normally mounted in the plane of the impaling blade, means for actuating the pitting means to sever the halves of the fruit from the pit, brake means for resisting the said actuating means, and means for actuating the pitting means to free the impaling blade of the pit.

12. In a fruit pitting machine, the combination of an impaling blade including a pair of spaced ringer blades providing a pit receiving recess, pitting means mounted in the pitting recess, a push blade interposed between the said ringer blades, means for actuating the push blade to position the pit in the pitting recess in relation to said pitting means, and means for actuating the pitting means.

13. In a fruit pitter, the combination of an impaling blade including a pair of spaced blades providing a pit receiving recess, a shear plate mounted at the back of the recess, and means for adjusting the position of the shear plate in said recess.

14. In a fruit pitting machine, the combination of an impaling blade including a pair of spaced ringer blades providing a pit receiving recess, a shear plate mounted at the back of the recess, the shear plate having a shank fitting between the spaced ringer blades, and means operably connected with said shank for adjusting the position of the shear plate in said recess.

15. In a fruit pitter, the combination of an impaling blade including a pair of blades spaced apart to form a path between them for the pit of a fruit, pitting means mounted on the impaling blade in the path of the pit, a shear plate mounted at the end of said path in position in relation to said pitting knife, and means for adjusting the position of said shear plate.

Signed at San Jose, Cal., this 26th day of April, 1929.

ALBERT R. THOMPSON.